United States Patent [19]

Terner et al.

[11] 4,226,914
[45] Oct. 7, 1980

[54] NOVEL SPRAYING COMPOSITION, METHOD OF APPLYING THE SAME AND ARTICLE PRODUCED THEREBY

[75] Inventors: Leslie L. Terner, West Bloomfield; David Moskowitz, Southfield; Roy L. Van Alsten, Redford, all of Mich.

[73] Assignee: Ford Motor Company, Dearborn, Mich.

[21] Appl. No.: 907,530

[22] Filed: May 19, 1978

[51] Int. Cl.$^2$ .................... B05D 1/08; B32B 13/04; B32B 9/04; C01B 31/36
[52] U.S. Cl. .................... 428/446; 423/345; 427/34; 427/423; 428/428; 428/450
[58] Field of Search ............... 427/34, 423; 428/446, 428/428, 450; 423/345

[56] References Cited

U.S. PATENT DOCUMENTS

| | | | |
|---|---|---|---|
| 2,775,531 | 12/1956 | Montgomery | 427/423 |
| 2,998,322 | 8/1961 | Strate | 427/190 |
| 3,019,128 | 1/1962 | Smiley | 428/446 |
| 3,095,316 | 6/1963 | Hartwig | 428/446 |
| 3,274,007 | 9/1966 | Jones | 428/446 |
| 3,275,471 | 9/1966 | Lowell | 427/430 B |
| 3,419,415 | 12/1968 | Dittrich | 428/368 |
| 3,676,179 | 7/1972 | Bokros | 428/446 |
| 3,925,577 | 12/1975 | Fatzer | 428/446 |
| 4,075,376 | 2/1978 | Jaeyer | 428/34 |

FOREIGN PATENT DOCUMENTS 716836  10/1954  United Kingdom ............... 428/446

*Primary Examiner*—Ellis P. Robinson
*Attorney, Agent, or Firm*—William E. Johnson; Keith L. Zerschling

[57] ABSTRACT

This application discloses a new powder composition which may be plasma sprayed onto the surface of an article to provide a protective coating therefor. The protective coating may be resistant to heat, wear, and corrosion. The coating may also provide a thermal or radiation barrier.

In particular, the coating composition for arc plasma spraying consists of finely divided silicon carbide mixed with finely divided silicon. This coating composition is applied to a substrate by developing a plasma spray, feeding the coating composition to the plasma spray and directing the plasma spray at an exposed surface of the substrate so that the exposed substrate is coated with a coating which consists essentially of beta silicon carbide and silicon.

The new article of manufacture disclosed in this application, is a substrate with a tightly adherent coating thereon consisting essentially of beta silicon carbide and silicon. The substrate may be any material, either metallic or non-metallic, to which the coating adheres. The coating may provide the substrate with wear resistant characteristics as, for example, if the substrate is to be used for machining metals or as a valve seat in an aluminum engine. The substrate, with the coating thereon, may be used to withstand severe temperatures as, for example, in rocket nozzles and other areas where a substrate would be subjected to extreme temperatures.

15 Claims, No Drawings

NOVEL SPRAYING COMPOSITION, METHOD OF APPLYING THE SAME AND ARTICLE PRODUCED THEREBY

BACKGROUND OF THE INVENTION AND PRIOR ART STATEMENT

In order to improve the wear resistance or thermal resistance characteristics of a surface of a substrate, it has been proposed to apply to the surface a material such as silicon carbide. The prior art has suggested that silicon carbide be applied in a plasma spray operation to the surface of a substrate so as to provide a protective coating therefor. However, when a person plasma sprays silicon carbide onto the surface of a substrate, the deposition products include silicon carbide, silicon dioxide and a very minute amount of silicon not exceeding parts per million. The coating, so applied, is not tightly adherent to the surface of the substrate and may be removed easily by wiping or scraping.

We, in our own experimentation, have documented the fact that silicon carbide cannot be successfully plasma sprayed onto the surface of a substrate. We have found, as others have found, that arc spraying of silicon carbide does not produce a tightly adherent coating on a substrate. Rather, such arc spraying produces a coating on the substrate which can be removed easily by either a wiping action or a scraping action. Thus, the arc plasma spraying of silicon carbide onto a substrate does not produce an article of manufacture which has utility in providing either a wear resistant or a heat resistant surface on the substrate.

U.S. Pat. No. 3,419,415 teaches the plasma spraying of a mixture containing a refractory carbide and at least five percent by weight, based on the molecularly bound carbon in the carbide, of excess carbon in a form capable of reacting with the metal of the refractory carbide at flame sprayed temperatures to form a carbide. This patent indicates that the excess carbon is preferably in an amount of 10 to 100% by weight of the molecularly bound carbon. The patent mentions that silicon carbide may be one of the starting carbide materials.

We attempted to reproduce the process disclosed in U.S. Pat. No. 3,419,415 according to the patent teachings while using silicon carbide as one of the ingredients of the mixture to be arc sprayed. The other portion of the mixture was carbon. In two separate experiments carried out on the silicon carbide-carbon mixture, the results achieved by us did not live up to what was stated in the patent. In both experiments, the coating deposited on the substrate contained silicon carbide and silicon oxide, as well as minute traces of silicon in the range of parts per million. The adherence of this coating to the substrate was in the range from no adherence to a very low level of adherence. The deposited coatings could be wiped or scraped from the substrate surface with little or no trouble and, therefore, did not provide on the surface either a wear resistant or a thermal resistant coating. The results achieved by spraying a combined silicon carbide-carbon mixture, in our opinion, was the same as is achieved when silicon carbide is sprayed by itself.

In order to duplicate the coating procedure set forth in U.S. Pat. No. 3,419,415, as above described, we conducted a pair of experiments, as described hereinbelow.

In the first experiment, 40 cc of beta silicon carbide powder was mixed with 12 cc of graphite, 4 cc of furfural and 50 cc alcohol, forming a coating compound where each individual silicon carbide particle was coated with a thin carbon film as per the instructions of the patent. This mixture was dried to form a powder and then plasma sprayed on several different substrates. The deposited coatings were tested for adherence and found to be easily removed from the substrates by a wiping or a scraping action. As stated above, an X-ray defraction pattern taken of some of the coatings showed that the coatings were formed of silicon carbide, silicon dioxide, and minor proportion of silicon in the parts per million range.

In a second experiment, commercial grade graphite was mixed with silicon metal powder and then plasma sprayed onto different substrates. This mixture contained 33% by volume graphite in 66.6% by volume silicon metal powder. The deposited coating was tested for adherence and was found to be removed easily from the substrate by wiping or scraping. Once again, the X-ray defraction characteristics of the coating indicated that the coating was made up of silicon carbide, silicon dioxide and a very minor proportion in parts per million of silicon. Thus, the U.S. Pat. No. 3,419,415 patent teaches a silicon carbide-carbon coating which is not tenaciously adherent to a substrate when flame sprayed thereon.

U.S. Pat. No. 3,274,077 discloses a high temperature resistant, self-healing coating and method of application. Generally, the method relates to the arc plasma spray coating of a coating which consists of a refractory oxide having silicon mixed therewith. In this particular case, the material which is arc plasma sprayed produces a coating on a substrate in which the silicon coats over and between the refractory oxide particles. The resulting coating on the article is one in which refractory oxides are associated with silicon. There is no interaction between the refractory oxide and the silicon associated therewith.

It is an object of the present invention to provide as a new article of manufacture, a substrate having a tightly adherent coating thereon which is wear resistant and heat resistant, the coating consisting essentially of beta silicon carbide and silicon.

It is a further object of this invention, to provide a new coating composition for arc plasma spraying which consists essentially of finely divided silicon carbide mixed with finely divided silicon.

It is a still further object of this invention, to provide a method of developing a coating on a substrate in which a mixture of finely divided silicon carbide and silicon are fed to a plasma spray and that plasma spray is directed at an exposed surface of a substrate so that the exposed substrate is coated with a coating consisting essentially of beta silicon carbide and silicon.

SUMMARY OF THE INVENTION

This invention relates to a new coating composition for arc plasma spraying, method of applying the same, and product produced thereby, and, more particularly, to such a composition, method and product in which the coating applied supplies wear and heat resistant characteristics to a substrate to which it is applied. The coating may, in some cases, also supply a chemical resistance to the surface of the substrate which has been coated. The coating may serve other functions for which coatings are applied to the surfaces of substrates, such as to provide radiation protective surfaces, surfaces which have excellent wear resistance, and surfaces which may be exposed to corrosive environments for prolonged periods of time without being adversely affected.

In accordance with the teachings of this invention, a coating composition for arc plasma spraying consists essentially of finely divided silicon carbide mixed with finely divided silicon. In accordance with a preferred embodiment of the invention, the finely divided mixture for plasma spraying consists essentially of silicon carbide and silicon in which the individual silicon carbide particles have a size range in the range from 100 mesh (149 microns) to 325 mesh (44 microns) and the individual silicon particles have a size range in the range from 180 mesh (85 microns) to 325 mesh (44 microns). In accordance with another preferred embodiment, the finely divided mixture consisting essentially of silicon carbide and silicon is formed from silicon carbide in the form of beta silicon carbide microballoons having diameters in the range from 5 to 120 microns and individual silicon particles having a size range in the range from 180 mesh (85 microns) to 325 mesh (44 microns). In accordance with still further teachings of a preferred embodiment of the coating composition of this invention, the silicon carbide forms from at least 70 to 90% by volume of the finely divided mixture of silicon carbide and silicon. Preferably, the silicon carbide forms from 80 to 85% by volume of the finely divided mixture of silicon carbide and silicon.

This invention also teaches a method of developing a coating on a substrate. In essence, this method includes a step of developing a plasma spray. A mixture of finely divided silicon carbide and silicon is fed to the plasma spray. The plasma spray is directed at an exposed surface of the substrate whereby the exposed surface is coated with a coating consisting essentially of beta silicon carbide and silicon. In accordance with a preferred embodiment of this method, the finely divided mixture for plasma spraying is formed from individual silicon carbide particles having a size range in the range from 100 mesh (149 microns) to 325 mesh (44 microns) and individual silicon particles having a size range in the range from 180 mesh (85 microns) to 325 mesh (44 microns). In another preferred embodiment of the method of this invention, the finely divided mixture which is plasma sprayed consists essentially of silicon carbide in the form of beta silicon carbide microballoons having diameters in the range from 5 to 120 microns and silicon particles having a size range in the range from 180 mesh (85 microns) to 325 mesh (44 microns). In accordance with other preferred teachings of the method of this invention, the silicon carbide forms from at least 70 to 90%, preferably 80 to 85%, by volume of the finely divided mixture consisting essentially of silicon carbide and silicon.

In accordance with still further teachings of this invention, a method of forming a coating on a substrate is also taught. This method comprises projecting onto an exposed surface of the substrate by means of a plasma spray gun both silicon carbide and silicon. The silicon carbide is sublimed to the gaseous state and broken down to silicon and carbon by the plasma spray gun. The silicon is vaporized to the gaseous state by the high temperature of the plasma spray. A portion of the gaseous materials condense on the substrate. The carbon in flight or when condensed on the substrate reacts with silicon condensing on the substrate to form beta silicon carbide thereby to form a beta silicon carbide, silicon phase coating which is adherent to the substrate. In accordance with a particular embodiment of this method, the silicon carbide particles of the sprayed mixture is formed from individual silicon carbide particles having a size range in the range from 100 mesh (149 microns) to 325 mesh (44 microns) and individual silicon particles having a size range in the range from 180 mesh (85 microns) to 325 mesh (44 microns). In another preferred embodiment, the silicon carbide is in the form of beta silicon carbide microballoons having diameters in the range from 5 to 120 microns and silicon particles having a size range in the range from 180 mesh (85 microns) to 325 mesh (44 microns). In accordance with still further preferred teachings of this method, the silicon carbide forms from at least 70 to 90% by volume, preferably 80 to 85% by volume of the finely divided mixture of silicon carbide and silicon.

This specification also discloses as a new article of manufacture, a substrate and a coating on the substrate composed of beta silicon carbide and silicon, the coating being applied to the substrate by a plasma spray of a finely divided mixture consisting essentially of silicon carbide and silicon. In accordance with a preferred embodiment, the finely divided mixture for plasma spraying consists essentially of individual silicon carbide particles having a size range in the range from 100 mesh (149 microns) to 325 mesh (44 microns) and individual silicon particles having a size range in the range from 180 mesh (85 microns) to 325 mesh (44 microns). In accordance with another preferred embodiment of the new article, the finely divided mixture for plasma spraying consists essentially of silicon carbide in the form of beta silicon carbide microballoons having diameters in the range from 5 to 120 microns and silicon particles having a size range in the range from 180 mesh (85 microns) to 325 mesh (44 microns). In accordance with still other preferred teachings regarding this new article of manufacture, the finely divided mixture of silicon carbide and silicon for plasma spraying is one in which the silicon carbide forms from at least 70 to 90% by volume, preferably 80 to 85% by volume, of the finely divided mixture of silicon carbide and silicon.

This specification also teaches, as a new article of manufacture, a substrate with a tightly adherent coating thereon consisting essentially of beta silicon carbide and silicon. In accordance with preferred teachings of this specification, this new article of manufacture is one in which the tightly adherent coating contains from 15% by volume to 70% by volume beta silicon carbide, preferably 30% by volume to 60% by volume of beta silicon carbide.

The spray composition and method of applying the same as disclosed in this specification, is one which may be used on a variety of metallic and non-metallic substrates in order to provide a protective coating on that substrate. The protective coating may be a thermal protective coating, wear protective coating, environment protective coating, or a protective coating for whatever use desired. For example, if the coating is applied to materials used as machining elements, the coating provides a wear resistant surface which increases the useful life of the machining tool.

DESCRIPTION OF THE PREFERRED EMBODIMENTS

Plasma sprayed coatings of materials which have discreet melting points have been used for many years. See, M. L. Thorpe, The Plasma Jet and its Uses, Research and Development Volume 11, No. 1 (1960).

Plasma sprayed ceramic-oxide coatings are used as thermal barriers on metallic structural materials, see, J. A. Moch, Ceramics and Refractory Coatings, Material Engineering 11, Page 101-108, 1974. Many rocketry and aerospace developments use such combinations as superalloys, carbides or silicides, plasma sprayed to protect a substrate. See, C. J. Nessler and J. R. Palermo, Plasma Arc Coatings, Materials In Design Engineering, Pages 109-113, June, 1962. The purpose of the plasma sprayed coatings is to improve the surface hardness, wear, friction, oxidation and/or corrosion resistance.

A particularly useful coating material, if it can be successfully applied to a surface of a substrate, is a silicon carbide coating. The physical and mechanical characteristics of silicon carbide make it attractive for coating. In particular, the characteristics that make such a material attractive is its high temperature strength, hardness, wear, oxidation resistance, and resistance to neutron radiation damage at high temperature. The material also has good electrical conductivity. However, unlike other materials which have been plasma sprayed, silicon carbide does not melt, it sublimes at 2600° C.

Silicon carbide coatings on selected substrates have been achieved using chemical vapor deposition techniques. See, E. Fitzer and D. Kehr, Carbon, Carbide and Silicide Coating, Thin Solid Films 39, 55-67, 1976. Silicon carbide layers are formed by the simultaneous vapor deposition of silicon and carbon, derived from methylchlorosilanes, although mixture of silanes or chlorosilanes and hydrocarbons can be used. In another case, silicon carbide was deposited on nuclear fuel particles by technique of methyltrichlorosilane pyrolysis. These silicon-carbide-coated fuel particles were used in a carbon dioxide gas-cooled nuclear reactor. See, C. W. Forest, P. Kennedy and I. V. Sherman, UKAEA Reactor Group Report, TRG Report 2053(s), 1970.

We have attempted to plasma spray coat pure silicon carbide without success. When pure silicon carbide was sprayed on a substrate, the material actually deposited on the substrates consisted essentially of beta silicon carbide, silicon dioxide and a minute amount of silicon in parts per million. The material applied was easily removed from the substrate, as it had no adherence of any measurable degree to the substrate. The coating could be either wiped or scraped from the substrate without difficulty.

We have now developed a technique for plasma spray coating substrates with a silicon carbide silicon mixture which produces tightly adherent coatings of beta silicon carbide-silicon on the substrate. These coatings have high temperature strength, hardness, wear resistance, oxidation resistance, and resistance to neutron radiation at high temperature.

The coating material of this invention may be applied to any suitable substrate, whether metallic or non-metallic, in accordance with the method of this invention, to produce the article of this invention. Generally, a surface to be protected is prepared by degreasing the same and roughening it before the plasma spray coating operation is carried out. In general, if the surface is dirty, it may be degreased by using an ultrasonic bath containing organic substances such as benzene, acetone, carbon tetrachloride, or some other suitable solvent, as is well known in the art. The surface roughening can be accomplished by sand or glass blasting. In other cases, such as, for example, on an alumina surface, chemical etching may be used for surface roughening. The surface should be roughened only to a degree of sufficient to provide for the laying down of a tightly adherent coating.

Arc plasma spraying is known for applying a coating to a substrate. While many different types of arc plasma systems are available on the market, the equipment used by us is an Avco Plasma Spray System equipped with a Plasmadyne powder feeder. The gas used in the spraying equipment is argon and the temperature of the plasma spray was controlled by a current setting at 500 amps. The current can vary from 400 to 600 amps. The plasma flame temperature has been measured by several investigators and has been found to be as high as 30,000° F. In the test carried out by us, the inlet argon gas pressure was monitored and maintained above 40 psi. The distance of spraying from the nozzle to the substrate was generally in the range from 4 to 6 inches.

In accordance with particular embodiments of the invention, the material sprayed consisted essentially of a silicon carbide-silicon powder. In one preferred embodiment, the silicon carbide powder, either in an alpha or a beta phase, forms from at least 70 to 90% by volume, preferably 80 to 85% by volume, of the finely divided mixture. The silicon carbide particles generally have a size range in the range from 100 mesh (149 microns), to 325 mesh (44 microns), while the silicon particles have a size range in the range from 180 mesh (85 microns) to 325 mesh (44 microns).

In accordance with the most preferred teachings of this invention, the silicon carbide of the mixture to be plasma sprayed is in the form of beta silicon carbide microballoons having diameters in the range from 5 to 120 microns and silicon carbide particles having a size range in the range from 180 mesh (85 microns) to 325 mesh (44 microns). Once again, in this case, the silicon carbide preferably forms from at least 70 to 90% by volume, most preferably 80 to 85% by volume, of the finely divided mixture of silicon carbide and silicon. A method of making beta silicon carbide microballoon structures as disclosed in co-pending U.S. patent application Ser. No. 902,306 filed May 2, 1978 U.S. Pat. No. 4,166,841 and entitled Method for Making Pure Beta Silicon Carbide.

With the particular plasma spray equipment used by us, some preferred size ranges were developed with respect to the materials to be plasma sprayed. For example, if the finely divided mixture for plasma spray consisted of individual silicon carbide particles and silicon particles, it was preferred that the individual silicon carbide particles have a size range in the range from 100 mesh (149 microns) to 325 mesh (44 microns), and that the individual silicon particles have a size range in the range from 180 mesh (85 microns) to 325 mesh (44 microns). If the silicon carbide of the mixture was in the form of beta silicon carbide microballoons, it was preferred to use microballoons having a diameter in the range of from 5 to 120 microns as the material in the mixture to be sprayed. As is known to those skilled in the art, if a different type of spray equipment or feeder equipment is used, the particle size range of the spray materials may change slightly.

As previously mentioned, it is generally necessary to slightly roughen the substrate surface in order to attain a good adherence between the coating and the substrate. This is because the coating substrate bond obtained during plasma deposition is mainly a mechanical bond. However, some substrates also form a chemical bond with the coating as, for example, when the coating is applied on steel. Such a chemical bonding can be enhanced by post heat treatment.

TABLE 1
Effect of Powder Composition on Flow and Adherence of the Coating
Properties of Coating Powders and Coatings on Metal Substrates

| ID No. | Type of SiC | Size Range of SiC, μm | Size Range of Si, μm | Mix Ratio Vol. % SiC/Si | Feeding+ Observ. | Adher.++ Observ. |
|---|---|---|---|---|---|---|
| A | α | 80 av | 170-88 | 75/25 | good | excellent |
| B | β | 88-62 | 88-62 | 75/25 | good | good |
| C | α | 21 av | 44 av | 80/20 | fair | poor |
| D | β | 0.7 av | 44 av | 80/20 | poor | poor |
| E | * | 0.5 av | 44 av | 33.3/66.6*** | poor | fair |
| F** | β | 1-125 | 82-62 | 80/20 | excellent | excellent |

*Made by spraying a commercially-bought graphite with Si powder
**SiC made from microballons
***This is volume ratio of graphite/Si-not SiC/Si
+Flow of the powder is rated "excellent" if it flows smoothly and evenly from the Plasmadyne powder feeder. The powder flow is rated "good" if it flows unevenly. The powder flow is rated "fair" if it flows only at a reduced rate, and it is rated "poor" if the powder flow is intermittent.
++A rating of "excellent" was given to those coatings which canwithstand scraping, grinding and polishing with a diamondwheel without spearation or other adverse effects observableon the coat to substrate bonding. A rating of "good" wasgiven to those coatings whose adherence withstood scraping,but not grinding or polishing. A "fair" or "poor" ratingwas given to those coatings which could be scraped or wipedoff from the substrate surface.

From the results, tabulated in Table 1, we conclude that the spraying powder containing the cubic silicon carbide made from microballoons is the best. Its flow and adherence properties are excellent and the fact that it is hollow, with a highly uniform shell thickness, permits the use of a wider range of particle sizes.

To determine the relationship of the silicon content in the starting spray powder to the adherence and the silicon carbide present in the final deposited coat, a series of experiments was performed with the beta silicon carbide made from microballoons. Results are shown in Table 2.

TABLE 2
Effects of Changing Proportions of SiC to Si Powders on Composition of Coating

| SiC/Si Ratio in Powder | Flow of Powder | Adherence of Coating | SiC/Si Ratio After Coating |
|---|---|---|---|
| 100/none | excellent | none to poor | 100/trace* |
| 90/10 | excellent | good | 70/30** |
| 85/15 | excellent | excellent | 40/60 |
| 80/20 | excellent | excellent | 30/70 |
| 75/35 | excellent | excellent | 20/80 |

*Estimated from the x-ray diffraction trace by comparison with pre-mixed standards.
**Silicon dioxide (SiO$_2$) present.

X-ray diffraction traces were taken of all deposited coatings on the different substrates. From these X-ray diffraction traces, the coatings were identified as containing silicon and beta silicon carbide. The concentrations of the newly formed beta silicon carbides are dependent upon the starting powder and the spraying parameters, notably particle size, SiC-Si ratio, type of silicon carbide used, the spraying distance, and some other spraying related variables.

As silicon carbide particles pass through the very hot plasma flame, they sublime at about 2600° C. (4700° F.), producing silicon and carbon varpors. The added silicon powder vaporizes completely at a lower temperature. At the cold substrate, the silicon-rich vapor solidifies to form the SiC-Si coating. The newly formed silicon carbides are always found to be beta, even when the starting silicon carbide is the hexagonal (alpha) form.

Our experience indicates that without the extra silicon in the spray powder mix, which acts as a binder, the newly formed beta silicon carbide does not bond to the substrate. The formation of good coatings is further aided by the use of hollow spherical, microballoon particles of silicon carbide, which flow well and are easily entrained in the plasma jet.

Coatings on Metals

Table 3 lists various metal substrates which have been coated successfully with the SiC-Si powder mix. All the metallic substrates show excellent bonding with the deposited SiC-Si.

TABLE 3
Coatings on Metallic Substrates

| Substrate | Powder Mix ID. Ref.-Table 1 | Deposited Coating Thickness in μm |
|---|---|---|
| Stainless steel (303) | A, B, F | ND* |
| Cold rolled steel (1018) | A, B, F | ~45 |
| High carbon steel (D-2) | A, B | 45-50 |
| 4118 SAE grade steel | A, B | ~30 |
| Aluminum 2024 T-351 | A, B, F | 7-45 |
| Brass (¼ Hard) | A, B, F | ~40 |
| Copper | A, B, F | 30-50 |
| Inconel 600 | F | ND* |
| Nickel Chrome | F | ND* |
| High speed steel | B, F | ND* |

*Not determined (ND)

Coatings on Ceramics and Carbides

Table 4 lists the various ceramic substrates successfully plasma spray coated with silicon carbide-silicon powder mix. The coating thickness was not determined

TABLE 4
Coatings on Ceramic and Carbide Substrates

| Substrate | Powder Mix ID. Ref.-Table 1 | Quality of Bonding |
|---|---|---|
| Alumina (Al$_2$O$_3$) | B, F | good |
| Hot pressed Si$_3$N$_4$ | B, F | excellent |
| Injection molded Si$_3$N$_4$ | B, F | excellent |
| Sialon (Si$_4$Al$_2$O$_2$N$_6$) | B, F | excellent |
| Tungsten carbide | B, F | excellent |
| Titanium carbide | B, F | excellent |
| Reaction sintered α-SiC | B, F | excellent |
| Reaction sintered β-SiC | B, F | excellent |

Thermal-cycling of Coatings

By scraping, grinding and polishing we found the adherence between most substrates and the deposited coatings to be strong at room temperature. To determine the effect on the adherence at high temperature, selected samples were subjected to temperature cycling.

Sections cut from a 4118 SAE grade steel (carbon 0.17-0.23%, Mn 0.60-1.00%, Cr 0.30-0.70%, and Mo 0.08-0.15%) and from an alumina (Al$_2$O$_3$) substrate were plasma spray coated with silicon carbide-silicon. These sections were thermally cycled in air, in a resistance type of furnace. The furnace temperature was set to a pre-defined temperature and after the temperature was reached the sample was positioned, coating surface up, in the hot zone. The sample was kept at the set temperature for five minutes and then air quenched to room temperature. This cycling was repeated ten times at each temperature. During and after the ten cycles, the sample was examined for damage or other change, using the optical microscope.

The test was then continued at the next higher temperature.

TABLE 5
Thermal Cycling of Two Plasma-Spray Coated Substrates

| Substrate | Temp in °C. | No. of Cycles | Cycling Time | Observed Effect |
|---|---|---|---|---|
| 4118 SAE Steel | 500 | 10 | 5 min/each | None |
| 4118 SAE Steel | 600 | 10 | 5 min/each | None |
| 4118 SAE Steel | 700 | 10 | 5 min/each | Substrate color change, no change in coating. |
| 4118 SAE Steel | 800 | 10 | 5 min/each | Severe pitting on the substrate except where coated. |
| Alumina ($Al_2O_3$) | 1000 | 10 | 5 min/each | None |
| Alumina ($Al_2O_3$) | 1200 | 10 | 5 min/each | None |

Despite the difference in thermal expansion between the coating and the substrate, no separation, or cracking, resulted over the wide range of temperature used. Note that the linear thermal expansion coefficient of silicon carbide (SiC) is $4.4 \times 10^{-6}/°$ C., of alumina ($Al_2O_3$) $8.0 \times 10^{-6}/°$ C., silicon (Si) $4 \times 10^{-6}/°$ C., and of 4118 SAE grade steel $11.7 \times 10^{-6}/°$ C. The pitting observed on the 4118 SAE type of steel after the 800° C. temperature cycle may be the result of a phase transformation which this type of steel undergoes at about 750° C. At this point, the expansion increases drastically.

SUMMARY

Silicon carbide powder of hexagonal (alpha) or cubic (beta) type, mixed with silicon metal powder as a binder, can be successfully plasma sprayed on metal, ceramic, carbide, and other suitable substrates. The compositions of the deposited coatings were qualitatively identified with X-ray diffraction techniques. Optical and scanning electron microscopes were used to examine the microstructure of the deposits. Scraping, grinding and polishing techniques were used to check adhesion of the coating to the substrate. The newly formed silicon carbide in the coating is always beta and is strongly bonded in a silicon-rich surface. The silicon carbide content in the deposited coatings can be varied with the choice of silicon carbide-silicon mix ratio, starting powder particle size, spraying distance and other spraying parameters. The silicon content is always higher in the coating than in the starting powder.

UTILITY

The coating composition of this invention may be applied according to the method taught in this invention to produce a coated substrate. The coated substrate may have many utilities, as previously described. In order to demonstrate the utility of the coated substrate in one application, several examples of a coated metal working tool will be described.

EXAMPLE 1

Two T-15 high speed steel cutting tools are compared one with the other. One has no coating and the other has a silicon carbide-silicon coating, as disclosed in this specification. Both tools were used in a lathe to cut 1045 steel at a rate of 185 surface feet per minute with a cutting depth of 0.060 inches with a feed rate of 0.011 inches per revolution. A coolant, 589B, was used to cool the material being cut. At 25.1 minutes, the uncoated cutting tool failed due to excessive nose wear. A coated cutting tool failed by fracturing at 65.0 minutes of use.

EXAMPLE 2

The same two tools were compared using no coolant. The uncoated cutting tool failed by fracturing at 4.0 minutes of use. The coated cutting tool did not fail because the experiment stopped after 16.33 minutes. The measured nose wear on the coated tool, was 0.001 inch. An allowable nose wear is 0.010 inches, so the coated tool still was not worn out.

EXAMPLE 3

In a second test, similar to the test carried out in Example 1, an uncoated tool failed due to excessive nose wear at 31.7 minutes, whereas a coated tool failed due to fracturing at 81.5 minutes.

These examples demonstrate the utility of the coating of this invention when used to protect metal cutting tools. The coating has like utility in the several other areas mentioned.

While particular embodiments of the invention have been illustrated and described, it will be obvious to those skilled in the art that various changes and modifications may be made without departing from the invention, and, it is intended to cover in the appended claims all such modifications and equivalents as fall within the true spirit and scope of this invention.

What is claimed is:

1. As a new article of manufacture:
   a substrate, and, a tightly adherent wear and heat resistant coating on said substrate composed of beta silicon carbide and silicon, said coating being applied to said substrate by a plasma spray of a finely divided mixture consisting essentially of silicon carbide and silicon.

2. The new article of manufacture as defined in claim 1, wherein said finely divided mixture for plasma spraying consisting essentially of silicon carbide and silicon is formed from individual silicon carbide particles having a size range in the range from 100 mesh (149 microns) to 325 mesh (44 microns) and individual silicon particles having a size range in the range from 180 mesh (85 microns) to 325 mesh (44 microns).

3. The new article of manufacture as defined in claim 1, wherein said finely divided mixture consisting essentially of silicon carbide and silicon is formed from silicon carbide in the form of beta silicon carbide microballons having diameters in the range from 5 to 120 microns and silicon particles having a size range in the range from 180 mesh 85 microns) to 325 mesh (44 microns).

4. The new article of manufacture as defined in either claims 2 or 3, wherein silicon carbide forms from at least 70 to 90% by Volume of said finely divided mixture of silicon carbide and silicon.

5. The new article of manufacture as defined in either claims 2 or 3, wherein said silicon carbide forms from 80 to 85% by volume of said finely divided mixture of silicon carbide and silicon.

6. A method of developing a coating on a substrate which comprises:
   developing a plasma spray,
   feeding a mixture of finely divided silicon carbide and silicon to said plasma spray, and
   directing said plasma spray at an exposed surface of the substrate whereby said exposed surface is coated with a tightly adherent wear and heat resistant coating consisting essentially of beta silicon carbide and silicon.

7. The method of developing a tightly adherent wear and heat resistant coating on a substrate as defined in claim 6, wherein said finely divided mixture for plasma spraying consisting essentially of silicon carbide and silicon is formed from individual silicon carbide particles having a size range in the range from 100 mesh (149 microns) to 325 mesh (44 microns) and individual silicon particles having a size range in the range from 180 mesh (85 microns) to 325 mesh (44 microns).

8. The method of developing a tightly adherent wear and heat resistant coating on a substrate as defined in claim 6, wherein said finely divided mixture consisting essentially of silicon carbide and silicon is formed from silicon carbide in the form of beta silicon carbide microballoons having diameters in the range from 5 to 120 microns and silicon particles having a size range in the range from 180 mesh (85 microns) to 325 mesh (44 microns).

9. The method of developing a tightly adherent wear and heat resistant coating on a substrate as defined in either claim 7 or 8, wherein silicon carbide forms from at least 70 to 90% by volume of the finely divided mixture consisting essentially of silicon carbide and silicon.

10. The method of developing a tightly adherent wear and heat resistant coating on a substrate as defined in either claim 7 or 8, wherein silicon carbide forms from 80 to 85% by volume of said finely divided mixture of silicon carbide and silicon.

11. A method of forming a tightly adherent wear and heat resistant coating on a substrate comprising:
projecting onto an exposed surface of the substrate by means of a plasma spray gun both silicon carbide and silicon, said silicon carbide being sublimed to the gaseous state and broken down to silicon and carbon by the plasma spray gun and said silicon being vaporized to the gaseous state by the plasma spray gun, a portion of said gaseous materials condensing on said substrate, the carbon condensing on said substrate reacting with silicon condensing on said substrate to form beta silicon carbide thereby to form a beta silicon carbide, silicon phase coating which is adherent to said substrate.

12. The method of forming a tightly adherent wear and heat resistant coating on a substrate as defined in claim 11, wherein said finely divided mixture for plasma spray consisting essentially of silicon carbide and silicon is formed from individual silicon carbide particles having a size range in the range from 100 mesh (149 microns) to 325 mesh (44 microns) and individual silicon particles having a size range in the range from 180 mesh (85 microns) to 325 mesh (44 microns).

13. The method of forming a tightly adherent wear and heat resistant coating on a substrate as defined in claim 11, wherein said finely divided mixture consisting essentially of silicon carbide and silicon is formed from silicon carbide in the form of beta silicon carbide microballoons having diameters in the range from 5 to 120 microns and silicon particles having size range in the range frim 180 mesh (85 microns) to 325 mesh (44 microns).

14. The method of forming a tightly adherent wear and heat resistant coating on a substrate as defined in either claim 12 or 13, wherein silicon carbide forms from at least 70 to 90% by volume of said finely divided mixture of silicon carbide and silicon.

15. The method of forming a tightly adherent wear and heat resistant coating on a substrate as defined in either claim 12 or 13, wherein said silicon carbide forms from 80 to 85% by volume of said finely divided mixture of silicon carbide and silicon.

* * * * *